United States Patent
Lin

(10) Patent No.: US 11,663,392 B2
(45) Date of Patent: *May 30, 2023

(54) TIMING DRIVEN CELL SWAPPING

(71) Applicant: Taiwan Semiconductor Manufacturing Company, Ltd., Hsinchu (TW)

(72) Inventor: Yen-Hung Lin, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 96 days.

This patent is subject to a terminal disclaimer.

(21) Appl. No.: 17/227,462

(22) Filed: Apr. 12, 2021

(65) Prior Publication Data

US 2021/0232749 A1    Jul. 29, 2021

Related U.S. Application Data

(63) Continuation of application No. 16/257,822, filed on Jan. 25, 2019, now Pat. No. 10,977,416.

(60) Provisional application No. 62/624,182, filed on Jan. 31, 2018.

(51) Int. Cl.
*G06F 30/30* (2020.01)
*G06F 30/398* (2020.01)
*G06F 30/394* (2020.01)

(52) U.S. Cl.
CPC .......... *G06F 30/398* (2020.01); *G06F 30/394* (2020.01)

(58) Field of Classification Search
CPC .. G06F 30/398; G06F 30/394; G06F 2119/06; G06F 2119/12; G06F 17/5068
USPC ........................................................ 716/110
See application file for complete search history.

(56) References Cited

U.S. PATENT DOCUMENTS

| | | | |
|---|---|---|---|
| 7,366,997 B1 * | 4/2008 | Rahmat | G06F 30/367 716/120 |
| 8,069,429 B2 * | 11/2011 | Miller | G06F 30/392 716/124 |
| 8,782,584 B2 * | 7/2014 | Alpert | G06F 30/392 716/135 |
| 10,977,416 B2 | 4/2021 | Lin | |
| 2015/0074630 A1 * | 3/2015 | Akiyama | G06F 30/398 716/114 |
| 2018/0032661 A1 * | 2/2018 | Chen | G03F 7/70466 |

* cited by examiner

*Primary Examiner* — Jack Chiang
*Assistant Examiner* — Brandon Bowers
(74) *Attorney, Agent, or Firm* — Merchant & Gould P.C.

(57) ABSTRACT

A method for cell swapping is provided. A location for swapping a first cell is determined. One or more legal positions for cell placement are determined at the location. A plurality of cells is determined for of the plurality of legal positions. A second cell from the plurality of cells is determined based on timing information associated with each of the plurality. The first cell is swapped with the second cell.

20 Claims, 6 Drawing Sheets

TIMING DRIVEN CELL SWAPPING

CROSS REFERENCE TO RELATED APPLICATIONS

This application is a Continuation of and claims priority to U.S. patent application Ser. No. 16/257,822, filed Jan. 25, 2019, and titled "Timing Driven Cell Swapping" and claims the benefit of U.S. Provisional Application No. 62/624,182, filed Jan. 31, 2018, and titled "Timing Driven Cell Swapping," the complete disclosures of which are hereby incorporated herein by reference.

BACKGROUND

The process of designing of a chip starts with preparation of a system specification which includes overall goals and high level requirements of the chip. These goals and requirements span functionality, performance, physical dimensions and production technology. Once the system specification is prepared, architecture design is set. The architecture design of a chip includes a basic architecture to meet the chip specifications. Once the architecture is set, a functionality and logic design is performed. The functionality and logic design is then converted into a circuit design. After the circuit design, a physical design is carried out. During the physical design, circuit components are instantiated with their geometric representations. In other words, all macros, cells, gates, transistors, etc., with fixed shape and sizes are assigned spatial locations (i.e., placement) and have appropriate routing connection completed in metal layers. The result of the physical design is a set of manufacturing specification.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
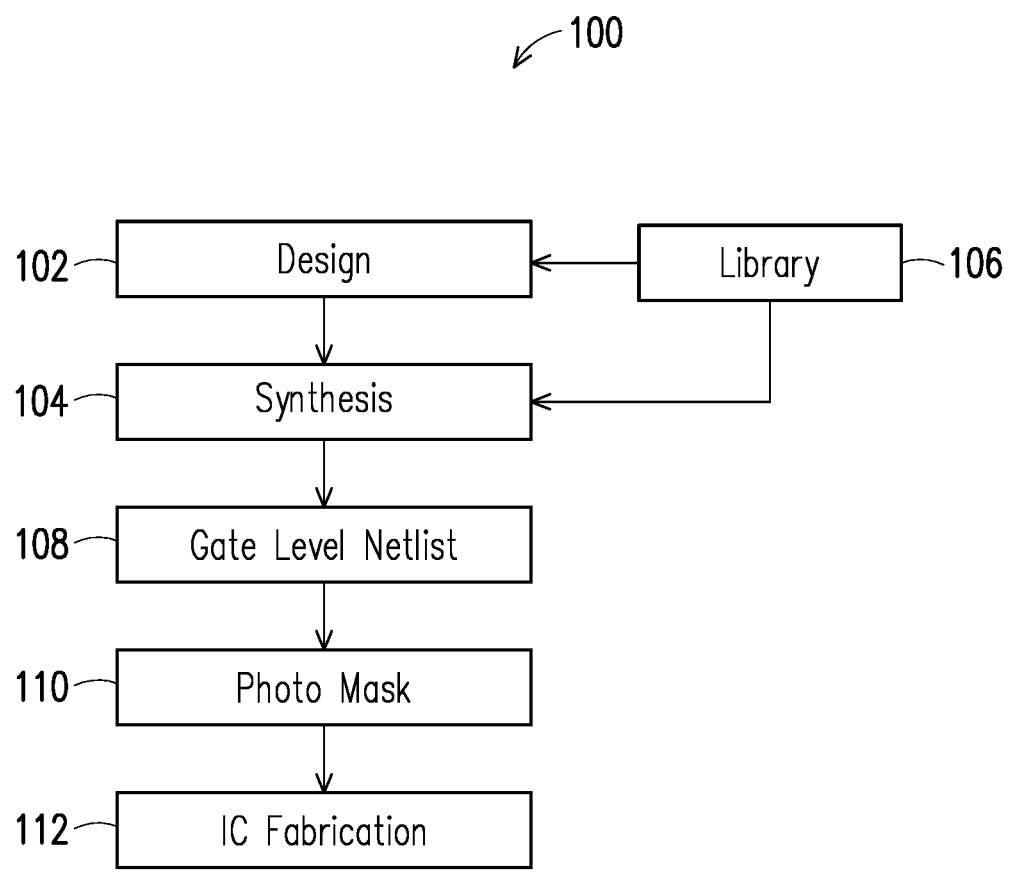
FIG. 1a is flow diagram of an example integrated circuit design and fabrication process, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated circuit automated design tools transform a circuit design into a circuit layout to be manufactured. This process typically includes turning a behavioral description of the circuit into a functional description, which is then decomposed into logic functions and mapped into rows of cells using a standard cell library. Once mapped, a synthesis is performed to turn the structural design into a physical layout, a clock tree is built to synchronize the structural elements, and the design is optimized post layout.

FIG. 1a generally illustrates an example integrated circuit design and fabrication process 100 that may be implemented for generating a physical layout from a user supplied behavioral/functional design for an integrated circuit. User design 102 specifies the desired behavior or function of the circuit based upon various signals or stimuli applied to the inputs of the overall design, and may be written in a suitable programming language. User design 102 may be uploaded into a computing system nit through the I/O interface by a user. Alternatively, user design 102 may be uploaded and/or saved on a memory device. An example computing system is described with reference to FIG. 5.

Synthesis 104 is performed on user design 102, in which the behavior and/or functions desired from user design 102 are transformed to a functionally equivalent logic gate-level circuit description by matching user design 102 to standard cells, such as from one or more cell libraries 106. Cell library 106 contains a listing of pre-designed components, or cells, each of which may perform a discreet logic function. The cells are stored in cell library 106 as information comprising internal circuit elements, the various connections to these circuit elements, a pre-designed physical layout pattern that includes the unit height of each cell along with the cell's designed power rails, dopant implants, wells, etc. Additionally, the stored cell may also comprise a shape of the cell, terminal positions for external connections, delay characteristics, power consumption, etc. Synthesis 104 results in a functionally equivalent logic gate-level circuit description, such as a gate-level netlist 108. Cell library 106 may be stored in a database on a memory device. Based on gate-level netlist 108, a photolithographic mask 110 may be generated, which is used for integrated circuit fabrication 112.

Embodiments of the disclosure provide methods and systems for cell swapping. The cell swapping disclosed herein is timing driven. That is, the disclosure provides a timing driven cell swapping methodology when one cell type provides several versions for the physical design constraints. The disclosed cell swapping methodology considers timing impact when swapping cells to meet the physical design constraints. Hence, performance of the circuit is maintained when requiring cell swapping for the physical design constraints. In addition, the disclosed cell swapping methodology improves an overall quality of result (QoR) by preventing from inserting or sizing up cells due to ignoring timing in cell swapping.

The process of laying out a circuit involves determining a physical placement of the desired circuit components within the integrated circuit package design in such a way as to optimize for parameters such as performance, physical space, power dissipation, and heat dissipation. The laying out task further includes placement of the desired components as well as routing of interconnections conductor signal paths between the components.

Placing related components closer to one another may improve performance, for example, by reducing capacitive loads due to length of the interconnection leads between signals to thereby reduce propagation delays between components. The layout process, therefore involves tradeoffs in several interrelated aspects of the circuit design. For example, a placement of a component in one location within the circuit will improve the circuit performance with respect to one parameter but degrade the performance with respect to another parameter. Or a particular placement, for example, may improve performance relative to one interconnect path but degrade performance for another path.

Figure 1B:
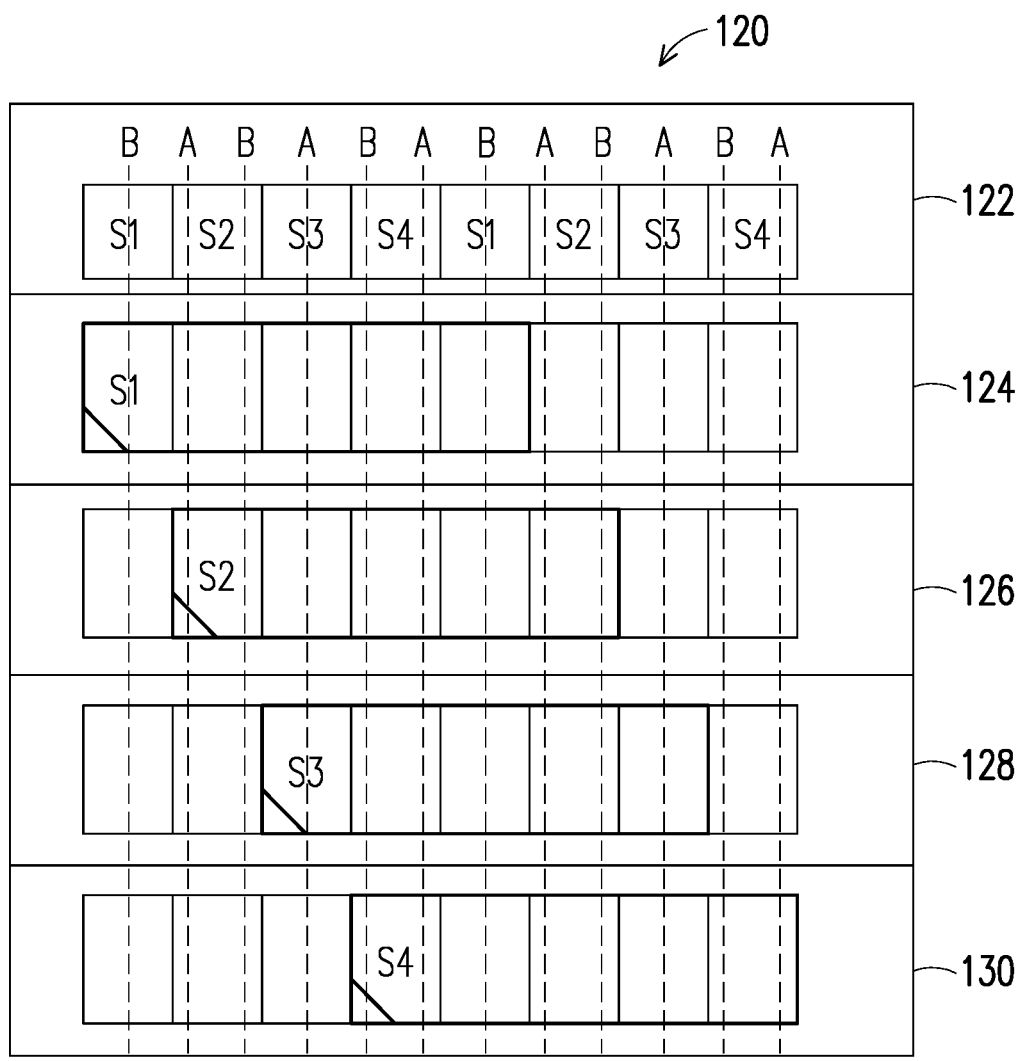
FIG. 1b an example schematic diagram of a physical layout of a location for cell placement, in accordance with some embodiments.

Balancing these tradeoffs require changing or swapping a component selected to a functionally equivalent optimized for a different performance, area, or power dissipation goals. In example embodiments, balancing these tradeoffs require changing or swapping different versions of one cell type to meet the physical design constraints. FIG. 1b illustrates an example schematic diagram of physical layout of a swap location. As shown in block 122 of FIG. 1b, the swap location includes a plurality of sites (i.e. site S1, site S2, site S3, and site S4). Each of the sites S1, S2, S3, and S4 is passed by metal tracks. For example, site S1 is passed by one metal track. One track is approximately a minimum spacing between two metals (i.e., a metal 1 and metal 1) via in a node. In example embodiments, metal 1 is a first level of metal as is used to route devices together in order to create logic or analog functions. Metal 1, for example, can be copper, gold, aluminum, tungsten, polymer, etc. Metal 1 is an exemplary in nature, and other metal levels are foreseeable. For example, a track can be the spacing between metal 1 and a polymer, metal 1 and metal 2, metal 2 and metal 2, etc.

As shown in FIG. 1b, the swap location provides a plurality of different options for placing a cell with a length of w pitches. In example embodiments, a pitch is a distance that separates two different interconnects. As shown in block 124 of FIG. 1b, a first cell with w pitches can be placed at the swap location starting at the site S1. In addition, and as shown at block 126, a second cell with w pitches can be placed at the swap location starting at the site S2. Moreover, and as shown at block 128, a third cell with w pitches can be placed at the swap location starting at the site S3. Furthermore, and as shown at block 130, yet a fourth cell with w pitches can be placed at the swap location starting at the site S4.

In example embodiments, the first cell, the second cell, the third cell, and the fourth cell can be multiple versions of a cell type associated with a cell to be swapped. For example, the first cell, the second cell, the third cell, and the fourth cell can be of different physical constraints (i.e., physical dimensions) of a cell type associated with the cell to be swapped. In other embodiments, the first cell, the second cell, the third cell, and the fourth cell can be swapped with one another to meet different physical constraints.

Sites S1, S2, S3, and S4 are exemplary in nature, and other sites are foreseeable. For example, a cell location can include more than four sites and a cell can be placed stating at any of those sites. In addition, different versions of a cell can have different pitches. For example, a cell can be two pitches long while another version of the same cell can be three or four pitches long. Moreover, different versions of a cell can have different timing information. In example embodiments, the timing information associated with a cell version is provided in terms of cell delay. Furthermore, different versions of a cell can have different interconnection points.

Figure 2:
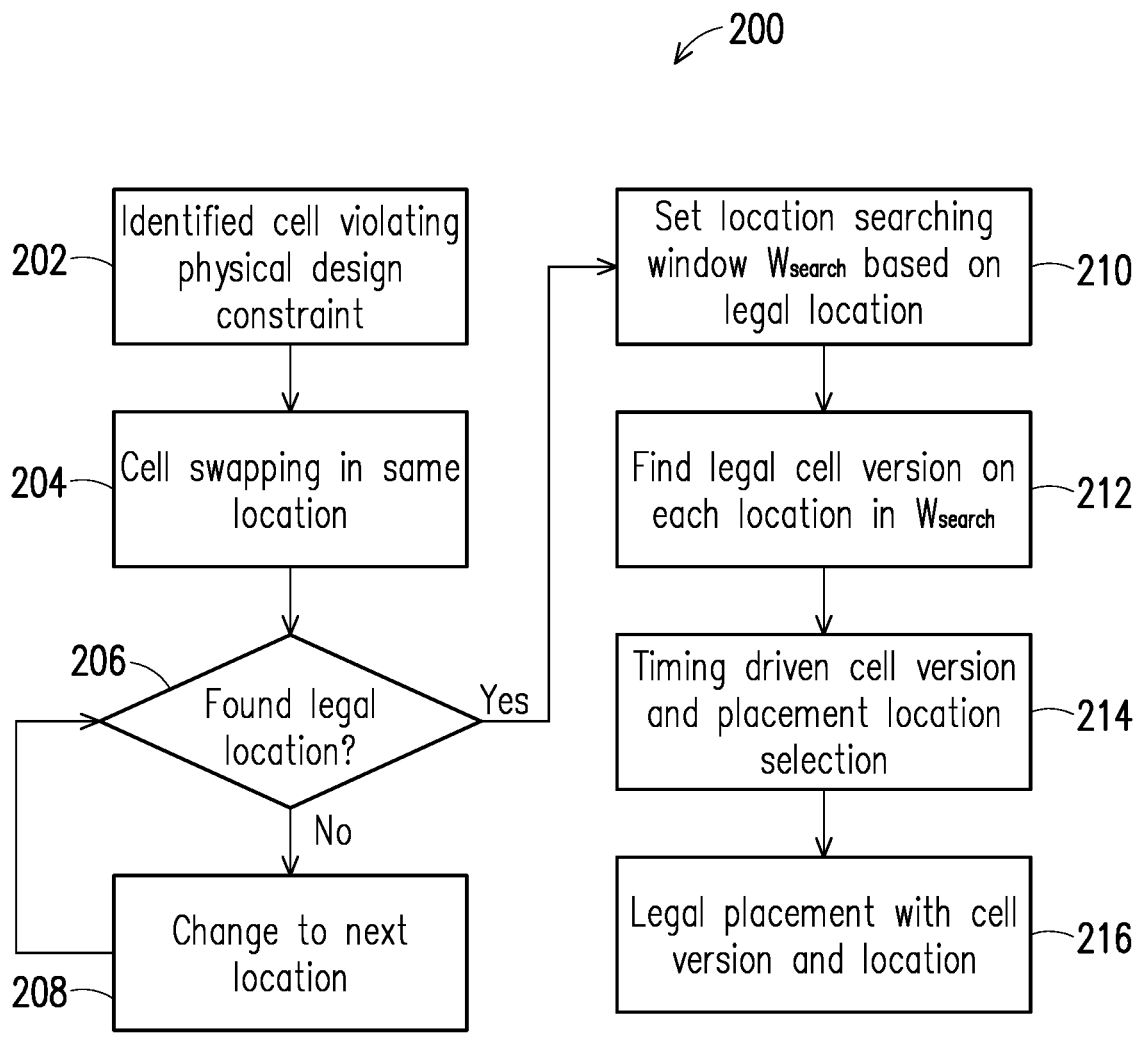
FIG. 2 is a flow diagram illustrating a method for cell swapping, in accordance with some embodiments.

FIG. 2 is a flow diagram illustrating a method 200 for cell swapping. In example embodiments, method 200 is also referred to as a timing driven cell swapping method. Method 200 begins at operation 202, where a cell violating one or more physical design constraints is identified. For example, a first cell violating one or more physical constraints for a circuit or a chip is identified. In other examples, more than one cells violating one or more physical constraints for a circuit or a chip are identified. In example embodiments, one or more cells violating the physical constraints are identified automatically, for example, by a computer aided engineering (CAE) or an electronic design automation (EDA), or manually by a circuit designer.

At operation 204 of method 200, a determination is made whether to swap cells at a same location of the cell violating the physical design constraints. For example, a current location of the first cell violating the physical design constraints is identified. Then, it is determined whether to swap cells at the current location of the first cell. In example embodiments, the CAE determines whether to swap cells at the same location. In other examples, a circuit designer determines whether to swap cells at the same location.

In example embodiments, the same location refers to the location of the first cell identified as violating the physical design constraints or a current location identified as the swap location. In some example embodiments, a cell violating a physical design constraint can either be replaced with a different version of the same cell type or with another cell of different cell type.

At operation 206 of method 200, a determination is made whether a legal location has been found. For example, after determining a swap location at operation 204, at operation 206 a determination is made as to whether the determined swap location is a legal location. In example embodiments, determining whether a swap location is a legal position (also referred to as legalization) includes finding a non-overlapping placement location for a cell to minimize any adverse impact on design objectives. In example embodiments, the legal position is determined by the CAE or the circuit designer.

If the swap location is found not to be a legal location at operation 206, then at operation 208 of method 200, the swap location is changed to a next location. For example, a next location on the chip where the cell swapping can be performed is determined. In example embodiments, the next location can be on a same floor or a different floor of the chip. In some embodiments, the next location is determined by the CAE or the circuit designer.

After changing the swap location to a next location at operation 208, method 200 then loops back to operation 206 to determine whether the next location is a legal location. In example embodiments, operations 206 and 208 are repeated until a legal location for the cell swapping has been found. In example embodiments, operations 206, and 208 are repeated for a predetermined number of loops.

If the swap location is found to be a legal position at operation 206, then at operation 210 of method 200, a position searching window $W_{search}$ is set based on the legal location. In example embodiments, the position searching window $W_{search}$ is operative to determine potential positions for cell placements at a current swap location. The potential positions are determined based on physical constraints of the swap location and the physical constraints of the cell to be placed. For example, and as shown in FIG. 1, the different positions can include site S1, site S2, site S3, and site S4.

At operation 212 of method 200, a legal cell version is determined for each positions determined in the position searching window $W_{search}$. In example embodiments, more than one version of cells is provided to meet different physical constraints. At operation 212, method 200 determines, for each position determined in the position searching window $W_{search}$, a cell version which meets the physical constraints for that position. In example embodiments, the legal cell version is determined by the CAE or the circuit designer. In example embodiments, after reading this disclosure, it will be apparent to a person with the ordinary skill in the art that in some circumstances a legal cell version may not be found for each position found in the position searching window $W_{search}$.

At operation 214 of method 200, a timing driven cell version and placement location is selected. In example embodiments, each cell versions contain different timing information. For example, with positions of FIG. 1, a cell version for site S1 can have different timing information than that of cell versions for site S2, S3, or S4. In example embodiments, a cell version which meets the physical constraints as well as timing constraints is selected. In example embodiments, timing constraints for a cell placement can be defined by the CAE or the circuit designer. The timing constraints can be defined in terms of a cell delay or a system clock. A cell version which meets that defined timing constraints in addition to the physical constraints can be selected for placement at the legal location.

At operation 216 of method 200, a legal placement of the cell version and location is performed. For example, after selecting a cell version which meets the timing constraints as well as physical constraints at operation 214, the selected cell version is placed at the legal position of the selected version.

Figure 3:
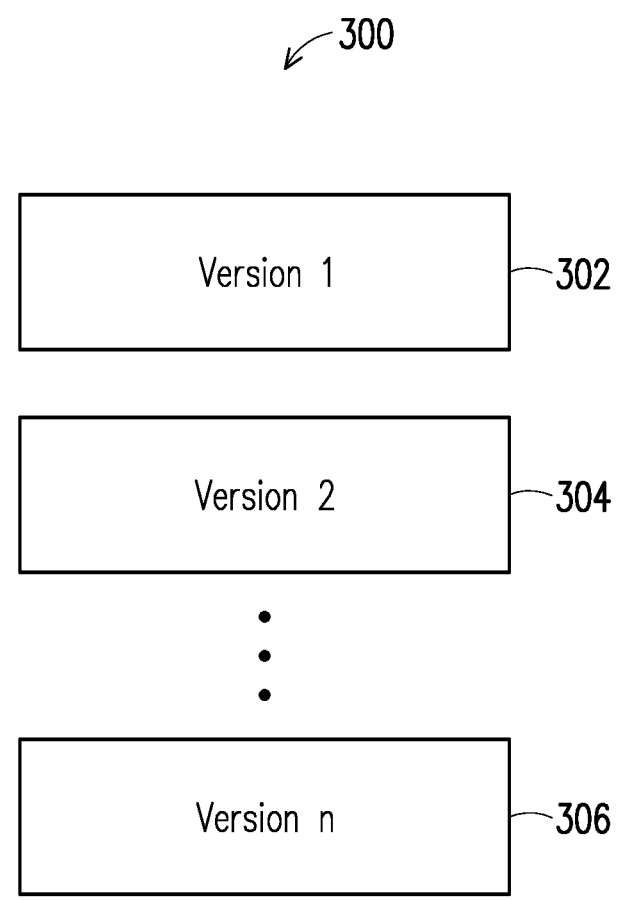
FIG. 3 is a diagram illustrating an example of placement location selection, in accordance with some embodiments.

FIG. 3 is a diagram illustrating an example embodiment of placement location selection. In the example embodiment of FIG. 3, a minimum displacement location for each cell version is determined. In example embodiments, the minimum displacement is determined from a starting location which is used to set the $W_{search}$. After section of the minimum displacement location, a cell version and a legal location is selected to minimize the cell delay and a displacement.

For example, as shown in FIG. 3, feasible candidates can include n-versions of a cell each providing a minimum displacement from a legal location. For example, as shown in block 302 of FIG. 3, cell version 1 is associated with a minimum displacement at location $l_1$. Moreover, and as shown in block 304 of FIG. 3, cell version 2 is associated with a minimum displacement at location $l_2$. Similarly, and as shown in block 306 of FIG. 3, cell version n is associated with a minimum displacement at location $l_n$. In example embodiment, a legal position and the cell version for swapping is selected to minimize cell delay and displacement.

Figure 4:
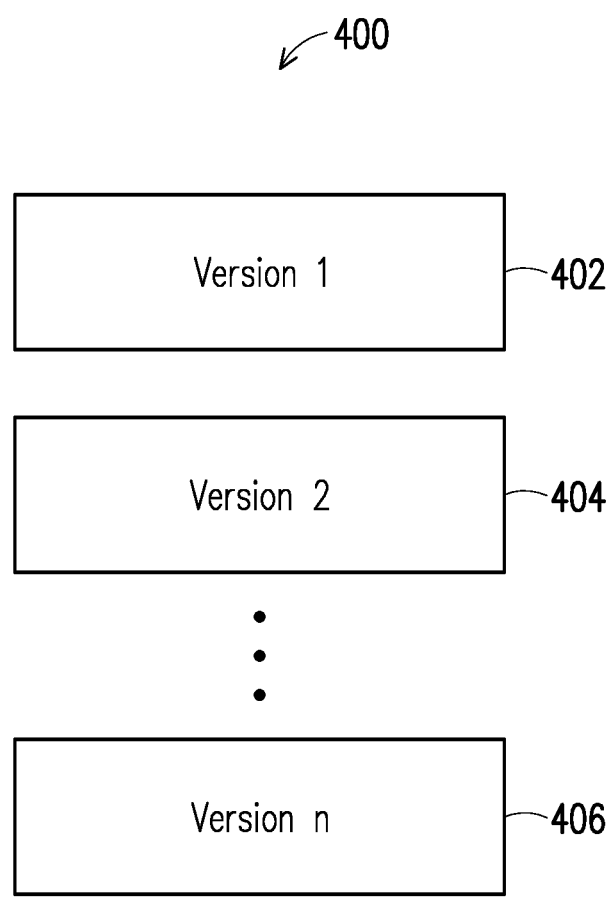
FIG. 4 is a diagram illustrating another example of placement location selection, in accordance with some embodiments.

FIG. 4 is a diagram illustrating another example embodiment of placement location selection. In the example embodiment of FIG. 4, a maximum displacement location for each cell version is selected from legal candidates. In example embodiments, the maximum displacement is measured from a starting location which is used to set the $W_{search}$. After section of the maximum displacement location, a cell version and a legal location is selected to maximize cell delay and the displacement.

For example, as shown in FIG. 4, feasible candidates can include n-versions of a cell each providing a maximum displacement from a legal location. For example, as shown in block 402 of FIG. 4, version 1 is associated with a maximum displacement at location $l_1$. Moreover, and as shown in block 404 of FIG. 4, version 2 is associated with a maximum displacement at location $l_2$. Similarly, and as shown in block 406 of FIG. 4, version n is associated with a maximum displacement at location $l_n$. In example embodiment, a cell version and a legal position is selected to maximize cell delay and the displacement.

Figure 5:
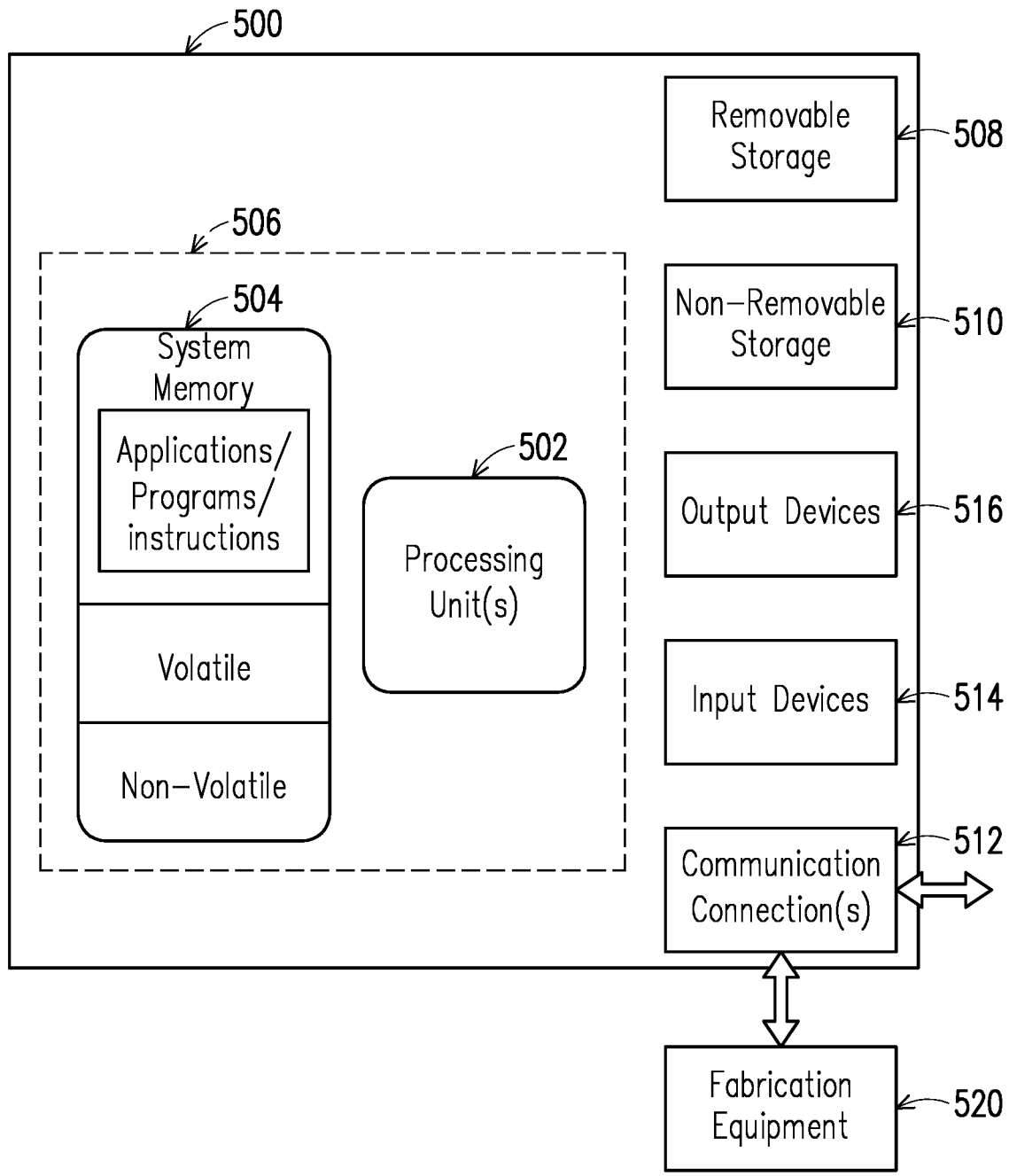
FIG. 5 illustrates an example of a suitable operating environment in which one or more of the present examples may be implemented.

FIG. 5 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), nonvolatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of any of the above should also be included within the scope of computer readable media.

Operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in system memory 504. While executing on processing unit 502, program modules stored in the system memory 504 (e.g., applications, Input/Output (I/O) management, and other utilities) may perform processes including, but not limited to, one or more of the stages of the operational methods described herein such as method 100 illustrated in FIG. 1a and method 200 illustrated in FIG. 2 for example. The operating environment 500 may further be operably connected to suitable fabrication tools and equipment 520 via communications connections 512, for example, for fabricating the ICs as shown in the method of FIG. 1a.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

In accordance with an embodiment a method for cell swapping, performed by a processor, comprises: determining a location for swapping a first cell; determining a plurality of legal positions for cell placement at the determined location; determining a plurality of cells for placement at the plurality of legal positions; determining a second cell from the plurality of cells based on timing information associated with each of the plurality of cells; and swapping the first cell with the second cell.

In accordance with an embodiment a system for cell swapping comprises: a memory storage having instructions stored thereon; and a processing unit coupled to the memory storage, wherein the processing unit is operative to execute the instructions, and wherein the instructions when executed by the processing unit are operative to: determine a cell violating a physical design constraint associated with a circuit; determine a location for cell swapping; determine a plurality of legal positions at the determined location; determine a plurality of cell versions the plurality of legal positions; and determine a cell version from the plurality of cell versions for swapping with the cell violating the physical design constraint of associated with the circuit, the cell version being determined based on timing information associated with each of the plurality of cell versions.

In accordance with an embodiment, a non-transitory computer-readable medium that stores a set of instructions which when executed perform a method for cell swapping, the method executed by the set of instructions includes determining a first cell for swapping; determining a location for swapping the first cell; determining a plurality of legal positions for cell placement at the determined location; determining a plurality of cells for the plurality of legal positions; determining a second cell from the plurality of cells based on timing information associated with each of the plurality of cells; and swapping the first cell with the second cell.

In example embodiments, any of the methods, apparatus, and systems described herein can be used in conjunction with a wide variety of scan-based or partially-scan-based circuits and in connection with a wide variety of diagnostic procedures. Moreover, disclosed methods, apparatus, and systems may be utilized to determine fault types associated with the identified systematic defects. The fault types may include, for example, stuck-at faults, transition faults, hold-time faults, and other faults. Further, fault types identified using test sets generated according to the disclosed techniques need not be of a particular type, but can vary from implementation to implementation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for cell swapping, the method comprising:
determining a cell violating a physical design constraint associated with a circuit;
determining a location for swapping the cell;
determining a plurality of cell versions of the cell for placement at the location;
determining a cell version from the plurality of cell versions based on displacement information associated with each of the plurality of cell versions; and
swapping the cell with the cell version.

2. The method of claim 1, wherein determining the plurality of cell versions for placement at the location comprises:
determining a plurality of legal positions for cell placement at the location; and
determining the plurality of cell versions for placement at the plurality of legal positions.

3. The method of claim 2, wherein determining the plurality of legal positions at the location comprises determining the plurality of legal locations using a location searching window.

4. The method of claim 1, wherein determining the location for swapping the cell comprises:
identifying a first location associated with the cell;
determining that the first location is not a legal location for the cell placement; and
determining, in response to determining that the first location is not the legal location, a second location comprising the legal location for the cell placement.

5. The method of claim 1, wherein determining the plurality of cell versions comprises determining the plurality of cell versions of a cell type associated with the cell.

6. The method of claim 5, wherein determining the plurality of cell versions of the cell type associated with the cell comprises determining the plurality of cell versions, of the cell type associated with the cell, having associated physical design constraint not violating a physical design constraint of a circuit when placed at a respective legal position.

7. The method of claim 1, further comprising:
creating a photomask of an integrated circuit comprising the cell version; and
fabricating the integrated circuit based on the created photomask.

8. A system for cell swapping, the system comprising:
a memory storage having instructions stored thereon; and
a processing unit coupled to the memory storage, wherein the processing unit is operative to execute the instructions, and wherein the instructions when executed by the processing unit are operative to:
determining a location for swapping a first cell;
determining a plurality of cells for placement at the location;
determining a second cell from the plurality of cells based on displacement information associated with each of the plurality of cells; and
swapping the first cell with the second cell.

9. The system of claim 8, wherein the processing unit being operative to determine the plurality of cells for placement at the location comprises the processing unit being operative to:
determine a plurality of legal positions for cell placement at the location; and
determine the plurality of cells for placement at the plurality of legal positions.

10. The system of claim 9, wherein the plurality of legal locations are determined using a location searching window.

11. The system of claim 8, wherein the processing unit being operative to determine the location for swapping the first cell comprises the processing unit being operative to:
identify a first location associated with the first cell;
determine that the first location is not a legal location for the cell placement; and
determine, in response to determining that the first location is not the legal location, a second location comprising the legal location for the cell placement.

12. The system of claim 8, wherein the processing unit being operative to determine the second cell from the plurality of cells based on displacement information comprises the processing unit being operative to:
determine a minimum displacement for each of the plurality of cells; and
determine the second cell from the plurality of cells that minimizes the minimum displacement and a cell delay.

13. The system of claim 8, wherein the processing unit being operative to determine the second cell from the plurality of cells based on displacement information comprises the processing unit being operative to:
determine a maximum displacement for each of the plurality of cells; and
determine the second cell from the plurality of cells that maximizes a cell delay and the maximum displacement.

14. The system of claim 13, wherein the processing unit being operative to determine the maximum displacement comprises the processing unit being operative to determine the maximum displacement from an initial position of a location searching window employed to determine the plurality of legal positions.

15. The system of claim 8, wherein the processing unit is further operative to:
create a photomask of an integrated circuit comprising the second cell; and fabricate the integrated circuit based on the created photomask.

16. A non-transitory computer-readable medium that stores a set of instructions which when executed perform a method for cell swapping, the method executed by the set of instructions comprising:
   determining a cell violating a physical design constraint associated with a circuit;
   determining a location for swapping the cell;
   determining a plurality of legal positions for cell placement at the location;
   determining a plurality of cell versions of the cell for the plurality of legal positions;
   determining a cell version from the plurality of cell versions based on displacement information associated with each of the plurality of cells; and
   swapping the cell with the cell version.

17. The non-transitory computer-readable medium of claim 16, wherein determining the location for swapping the cell comprises:
   identifying a first location associated with the cell;
   determining that the first location is not a legal location for the cell placement; and
   determining, in response to determining that the first location is not the legal location, a second location comprising the legal location for the cell placement.

18. The non-transitory computer-readable medium of claim 16, wherein the displacement information comprises a minimum displacement and a maximum displacement of each of the plurality of legal positions at the determined location.

19. The non-transitory computer-readable medium of claim 16, wherein the cell version is determined to minimize a displacement and minimize a cell delay.

20. The non-transitory computer-readable medium of claim 16, wherein the cell version is determined to maximize a displacement and minimize a cell delay.

* * * * *